Figure 5:
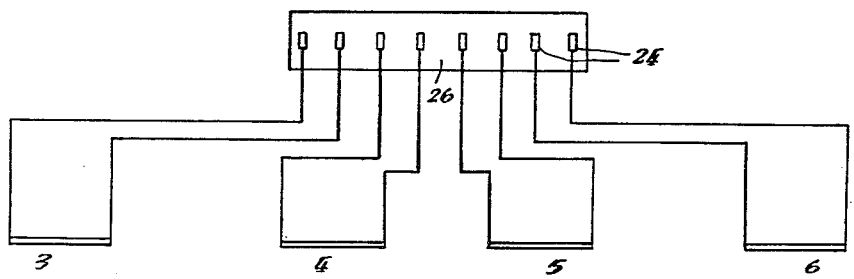

May 31, 1960     L. A. PERRETT     2,939,074
DEVICES FOR TESTING ROTARY MACHINES, ELECTRIC
MOTORS, GENERATORS AND THE LIKE
Filed March 25, 1957             2 Sheets—Sheet 1
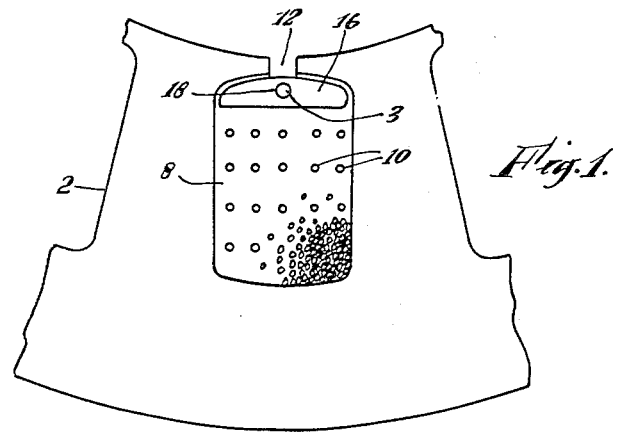
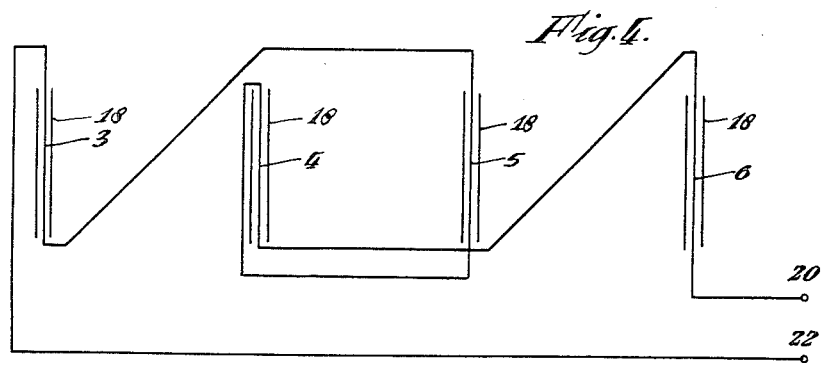
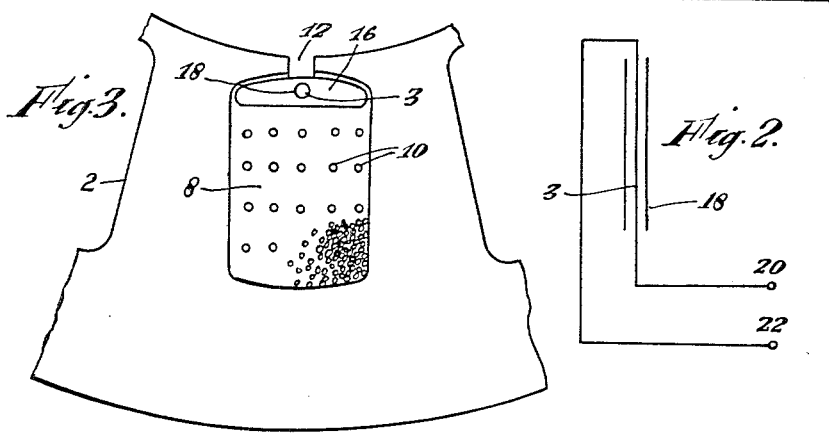
Inventor
Leslie Arthur Perrett
by Albert Jacobs
Attorney May 31, 1960  L. A. PERRETT  2,939,074
DEVICES FOR TESTING ROTARY MACHINES, ELECTRIC
MOTORS, GENERATORS AND THE LIKE
Filed March 25, 1957  2 Sheets-Sheet 2

Inventor
Leslie Arthur Perrett
by Albert S. Jackes
attorney

United States Patent Office 2,939,074
Patented May 31, 1960

2,939,074

DEVICES FOR TESTING ROTARY MACHINES, ELECTRIC MOTORS, GENERATORS AND THE LIKE

Leslie Arthur Perrett, Avonmouth, Bristol, England, assignor to Anstee & Ware Limited, Bristol, England, a company of Great Britain Filed Mar. 25, 1957, Ser. No. 648,062

Claims priority, application Great Britain Mar. 28, 1956

6 Claims. (Cl. 324—51)

This invention relates to devices for testing rotary machines, electric motors, generators and the like.

It is well known that a fault can develop in the rotor of an electrical machine which is not readily detectable. It a fault is suspected the present practice is to dismantle the motor for examination of the rotor and even then the fault in a conductor of the rotor or in the electrical joint thereof may not be visible or readily detectable as the fault may only be effective when the rotor is spinning.

It is therefore obviously desirable to be able to test for any such rotor fault whilst the rotor is in use. It may also be desired in practice to determine the slip frequency of a motor and the state of saturation of the magnetic circuit.

One of the objects of the invention is to provide means for indicating a fault in the rotor and/or for determining the slip frequency and/or the state of saturation of the magnetic circuit whilst the machine is running.

It is also well known that in use wear may occur in the rotor bearings or even a partial failure of one or both rotor bearings can take place unobserved causing eccentricity of the rotor in the stator and that continued use of the motor or generator in such condition can result in serious damage.

Another object of the present invention is to provide means for detecting, indicating and/or actuating protective devices under such circumstances.

According to the present invention there is provided a method of testing a rotary machine having a stator and a stator winding and using at least one additional conductor provided in said stator which consists in analysing the voltage generated in said additional conductor whilst a current is flowing in said stator winding.

According to a further feature of the invention there is provided a method which consists in comparing the voltages generated in at least two additional conductors disposed in spaced relation.

According to a still further feature there is provided apparatus for testing a rotary machine having a stator and stator winding comprising means for causing a current to flow in said stator winding, at least one additional conductor in said stator and means for analysing the voltages generated in said additional conductor whilst said current is flowing. Such analysis may be directed to determining the slip frequency or state of saturation of the magnetic circuit or determining any abnormality of the said induced currents, such as would result from a fault in the rotor for example a broken or damaged rotor conductor. Such additional conductor or conductors may be positioned in a stator groove and may be in or under the wedge. The said conductors may be arranged so that when the bearings are sound and the rotor substantially concentric said generated voltages are balanced so that should the rotor thereafter become eccentrically positioned in said stator an out of balance of the generated voltages results which is then caused to actuate a warning signal or operate any safety device such as a magnetic cut-out.

Figure 6:
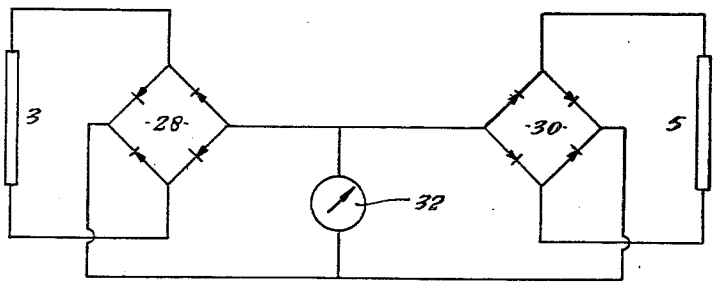
Figures 7, 8:
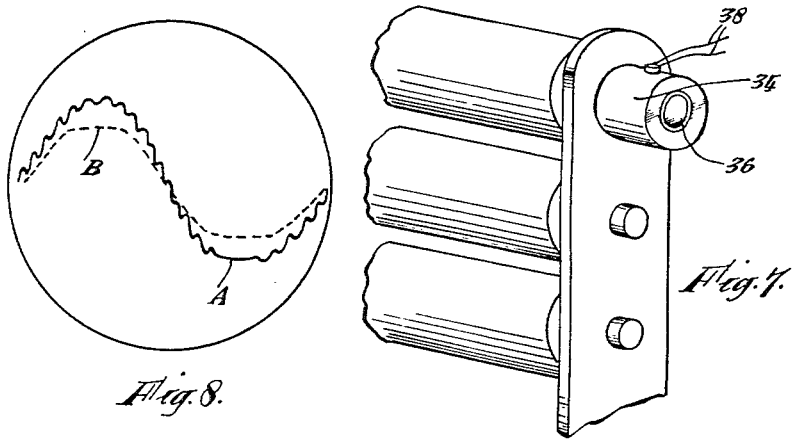

Referring to the drawings filed herewith:

Fig. 1 is a fragmentary section through a stator groove of a motor to which the invention has been applied, Fig. 2 is a circuit diagram of the additional conductor, Fig. 3 is a fragmentary section through a stator groove of a motor to which the invention has been applied, Fig. 4 is a circuit diagram of the additional conductors, Fig. 5 is a modified circuit diagram embodying a junction box to which leads from the additional conductors are carried, Fig. 6 shows an example of a bridge circuit, for comparing the voltages and a means of measuring the out of balance of the voltages induced in two opposite conductors, Fig. 7 is a diagram showing the application of the invention for testing the eccentricity of the shaft of a machine, Fig. 8 is a diagrammatic view of the curve traced on an oscilloscope.

Referring first to Figs. 1 and 2, the stator 2 is provided with an additional pure conductor 3 comprising a single strand of 23/0076 glass covered polychloropren copper wire disposed in a stator groove 8.

In Fig. 1 it will be seen that normal practice has been followed in winding the stator the individual turns of the winding 10 having been passed through the mouth 12 of the groove 8 and tightly packed therein after which a wedge 16 is inserted in the groove from one end thereof above the winding 10. In the present case however the wedge 16 is provided with a longitudinal hole 18 to receive the additional conductor 3.

To carry out a test for a rotor fault, the conductor 3 is connected in circuit with one set of deflecting plates of an oscilloscope (not shown) which is then adjusted to show the stationary 50 c./s. sine wave of the main field. Superimposed on the 50 c./s. voltage wave generated in the said conductor by the main field is a higher frequency sinusoidal ripple oscillation of small amplitude, due to the rotor bars or conductors inducing a voltage in the additional conductor. The composite curve traced on the oscilloscope is seen in Fig. 8.

Any discontinuity in the rotor circuit or deformation of the rotor conductors will show itself either as a missing ripple or a reduced or distorted ripple. A missing ripple is indicated at "A" Fig. 8 of the drawings filed herewith.

When testing the state of the magnetic circuit in an electrical machine for saturation or irregularity, one set of deflecting plates of an oscilloscope is connected across the said additional conductor 3. The trace on the oscilloscope will indicate whether the magnetic circuit is saturated or unsaturated. Saturation will be indicated by a flattening of the tops and bottoms of the sine wave. The flattened characteristic is indicated at "B" Fig. 8 of the drawings filed herewith the dotted line showing how the trace is displaced.

The frequency of the said ripple oscillations are determined by the speed of the rotor as well as the number of bars or conductors on the rotor, whilst the amplitude is determined by the load. When the motor is running at synchronous speed the superimposed oscillations appear to be stationary with respect to the fundamental sine wave, but as soon as the rotor speed falls below the synchronous speed the oscillations start to slip backwards. The slip frequency can thus be determined by observing the movements of the ripple oscillations with respect to the fundamental wave.

Referring now to Figs. 3 and 4, the stator 2 is provided with four additional pure conductors 3, 4, 5 and 6 symmetrically arranged relative to the rotor (not shown) each comprising a single strand of 23/0076, glass covered Polychloropren copper wire, disposed in a stator groove 8 said conductors being of the same length as the stator slot and connected in series in pairs at 180° so that the said pairs are at 90° to each other. That is to say the series circuit is 3, 5, 4, 6, the pairs of conductors 3 and 5 and 4 and 6 respectively being in series, the pair 3 and 5 being at 90° to the pair 4 and 6.

In Fig. 3 it will be seen that normal practice has been followed in winding the stator the individual turns of the winding 10 having been passed through the mouth 12 of the groove 8 and tightly packed therein after which a wedge 16 is inserted in the groove from one end thereof above the winding 10. The wedge 16 is provided with a longitudinal hole 18 to receive the additional conductor. It is to be understood that four such wedges are provided each with an additional conductor. However, in some machines, it is not necessary to provide a special wedge 16 with a hole 18 to contain the conductors, since there is sufficient room under the wedge in a normal slot for a conductor. Thus the drilling or making of a special wedge would only be required in cases where there was no available room. The conductors may also be fitted in the teeth or yoke of the stator. The conductors 3, 4, 5 and 6 may be of any size or shape and may be semi conductors if desired so as to make use of their well known amplifying characteristics and avoid having to use a voltage transformer or other amplifying device where the voltage generated in the conductor is too small for the actuation of a meter or other comparing device.

It will be appreciated that when the rotor is concentric in the stator the voltages generated in the additional windings are substantially in balance when opposed and no potential would appear across the terminals 20 and 22 to which said additional conductors are connected but should the rotor become eccentrically positioned due for example to one bearing becoming worn then the rotor will no longer be symmetrically disposed with regard to the additional conductors for example it may be closer to the conductor 6 than to the conductor 4. The reluctances are therefore unequal and the flux per pole will be smaller for the larger air-gap length and larger for the smaller air gap length. In this case there will be different voltages generated in the four additional conductors and the different voltage will be a measure of the difference of length. In Fig. 4 the resultant of the induced voltages will appear across the terminals 20 and 22, and this can be used to indicate the state of the air-gap in the machine. If desired this voltage can be made to actuate an indicator or warning device (not shown) or operate a cut out through suitable relays (also not shown) when the induced voltage reaches a predetermined value.

In a modified arrangement of the circuit as shown in Figure 5 of the drawings filed herewith to which reference is now made each connection from the conductors 3, 4, 5 and 6 is brought out, and separately connected to sockets 24 of a connecting junction box 26. The conductors can thus be connected up in an exterior circuit by means of a rotary switch (not shown), in any desired way. Instead of bringing all eight connections out to the junction box, the connections of one side of the conductors may be connected to a common point which is "earthed" to the frame of the machine.

An example of a bridge circuit for measuring the out of balance of the voltages induced in two opposite conductors is shown in Figure 6 of the drawings filed herewith. Two rectifier bridges 28 and 30 are connected in opposition. The inputs to the two bridges 28 and 30 are connected to a pair of opposite conductors, in this case to conductors 3 and 5 respectively. The outputs from the bridges are connected in opposition and a voltmeter or galvanometer 32 of any suitable type is connected across the outputs. The voltages generated in the conductors 3 and 5 are rectified by the bridges 28 and 30, and the voltmeter will indicate the difference between the two induced voltages. After conductors 3 and 5 have been compared the rotary switch is rotated so that the voltages generated in the conductors 4 and 6 are fed to the bridge circuit for comparison. In this way it is possible to detect any eccentricity of the rotor in the stator, since the conductors in which the largest voltage is generated must be that one which is nearest to the rotor. A voltage transformer or other amplifying device may be used between the conductor and the rectifier bridge.

It will be understood that although the invention has been described with reference to any electrical machine, it may be used in a slightly modified form on any machine, such as a rolling mill or lathe. Figure 7 of the drawings filed herewith shows how the invention may be used for testing the eccentricity of the shaft of a rolling mill. This is achieved by fitting a stator 34 having the conductors fitted therein, around the shaft 36 of the machine which then becomes the rotor, and thus makes it possible to determine any eccentricity of the shaft. The cables 38 house the leads to the stator windings as well as the leads to the auxiliary conductors.

What I claim and desire to secure by Letters Patent is:

1. In a machine having a rotating part, a stator and a stator winding, the provision of at least two additional conductors in said stator disposed in opposed spaced relation, means for energizing said stator, whilst operating said machine normally, means for comparing the voltages generated in said additional conductors in opposition, and means for indicating the result of said compared voltages, whilst the machine is running under normal operating conditions whereby the eccentricity of the rotary part may be determined.

2. In a machine having a rotating part, a stator and a stator winding, the provision of four additional conductors in said stator, said conductors being connected in series in pairs at 180° the pairs being at 90° to each other, means for energizing said stator whilst operating said machine normally, means for comparing the voltages generated in said pairs of additional conductors in opposition and means for indicating the resultant of said compared voltages whilst the machine is running under normal operating conditions whereby the eccentricity of the rotating part may be determined.

3. In an electrical machine having a rotor, a stator and a stator winding, the provision of at least two additional conductors in said stator disposed in opposed spaced relation, means for energizing said stator whilst operating said machine normally, means for comparing the voltages generated in said additional conductors in opposition, and means for indicating the resultant of said compared voltages whilst the electrical machine is running under normal operating conditions whereby the eccentricity of the rotor may be determined.

4. The combination according to claim 3, wherein the means for comparing the voltages generated in said additional conductors in opposition, comprises two rectifier bridges fed by respective addition conductors, the outputs from said bridges feeding a voltmeter in opposition.

5. In an electrical machine having a rotor, a stator and a stator winding, the provision of four additional conductors in said stator, said conductors being connected in series in pairs of 180°, the pairs being at 90° to each other, means for energizing said stator whilst operating said electrical machine normally, means for comparing the voltages generated in said pairs of additional conductors in opposition, and means for indicating the resultant of said compared voltages whilst said electrical machine is running under normal operating conditions whereby the eccentricity of the rotor may be determined.

6. The combination according to claim 5, wherein each of the four additional conductors is positioned in a longitudinal hole of a wedge placed in the top of a stator winding groove.

References Cited in the file of this patent

UNITED STATES PATENTS

| | | |
|---|---|---|
| 2,599,960 | Weichsel | June 10, 1952 |
| 2,640,100 | Packer | May 26, 1953 |
| 2,844,794 | Wright et al. | July 22, 1958 |

FOREIGN PATENTS

| | | |
|---|---|---|
| 297,473 | Great Britain | Feb. 21, 1930 |